United States Patent
Mihira

(10) Patent No.: US 7,653,729 B2
(45) Date of Patent: Jan. 26, 2010

(54) INFORMATION PROCESSING SYSTEM, SERVER APPARATUS, INFORMATION PROCESSING APPARATUS, AND CONTROL METHOD THEREOF

(75) Inventor: Yoshiro Mihira, Inagi (JP)

(73) Assignee: Canon Kabushiki Kaisha (JP)

( * ) Notice: Subject to any disclaimer, the term of this patent is extended or adjusted under 35 U.S.C. 154(b) by 326 days.

(21) Appl. No.: 11/610,210

(22) Filed: Dec. 13, 2006

(65) Prior Publication Data

US 2007/0136434 A1 Jun. 14, 2007

(30) Foreign Application Priority Data

Dec. 14, 2005 (JP) ............................. 2005-360837

(51) Int. Cl.
*G06F 15/173* (2006.01)
(52) U.S. Cl. ...................... 709/226; 709/223; 709/224
(58) Field of Classification Search ......... 709/223–226, 709/245
See application file for complete search history.

(56) References Cited

U.S. PATENT DOCUMENTS

| | | | |
|---|---|---|---|
| 6,374,300 B2 * | 4/2002 | Masters ..................... 709/229 |
| 7,043,632 B2 * | 5/2006 | Chapman et al. ............. 713/153 |
| 7,328,237 B1 * | 2/2008 | Thubert et al. .............. 709/203 |
| 7,457,873 B2 * | 11/2008 | Mariani et al. .............. 709/224 |
| 7,490,164 B2 * | 2/2009 | Srivastava ................... 709/238 |
| 2003/0172163 A1 | 9/2003 | Fujita et al. | |

FOREIGN PATENT DOCUMENTS

JP 2003-256310 A 9/2003

\* cited by examiner

*Primary Examiner*—Hussein Elchanti
(74) *Attorney, Agent, or Firm*—Rossi, Kimms & McDowell LLP

(57) ABSTRACT

This invention enables an operation checker to easily select a specific one of a plurality of servers on a load distribution system and cause the selected server to respond to a request for a server test or operation monitoring. To accomplish this, a Web service system (1) includes Web servers (10, 20, 30) in which service applications to respond to a request transmitted from a client (2) are installed, and a general-purpose load distribution apparatus (40) which transfers the request from the client (2). Each of the Web servers (10, 20, 30) acquires, from the request received from the client (2), server designation information to designate a Web server that should respond to the request from the client (2). The Web server transmits, to the client (2), cookie information of the client (2) together with the server designation information.

8 Claims, 11 Drawing Sheets

F I G. 9
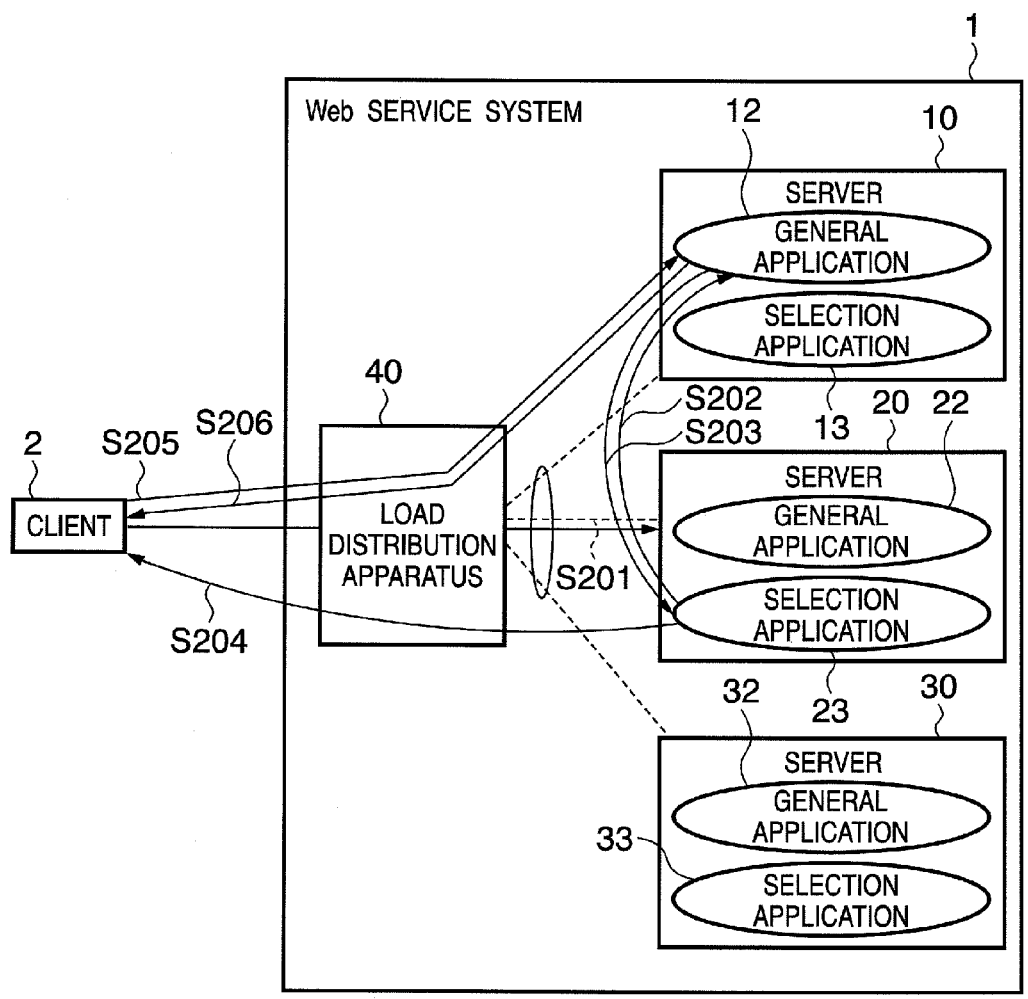

INFORMATION PROCESSING SYSTEM, SERVER APPARATUS, INFORMATION PROCESSING APPARATUS, AND CONTROL METHOD THEREOF

BACKGROUND OF THE INVENTION

1. Field of the Invention

The present invention relates to an information processing system, a server device and an information processing device which transmits a request to a server designated by a client in an environment where the workload is distributed to a plurality of servers.

2. Description of the Related Art

Computers are becoming more widespread along with performance improvement and cost reduction, and they now have important roles in the current business operations of corporations and the like. The use of computers has changed in the following way.

In the early days, the most commonly seen scheme was a centralized model where a large-sized computer was used from terminal apparatuses.

After some time, sophisticated small-sized machines arrived, significantly improving the performance of what individual users could afford. Thanks to this development, the conventional model of centralized server handling all the work was replaced by a decentralized client/server model where each personal computer terminal carries out some of the work previously handled by the central server. In the client/server model, however, if a large number of users existed, it was hard to maintain and manage applications running on the large number of client machines.

During the period when the client/server model was mainstream, the internet technology came along. The Internet made a dramatic progress, and a field of Web applications was established. The Web application indicates a Web-based application technology using the Web technology and LAN/WAN technology based on TCP/IP. This technology was used only for providing static content at first. That is, a Web server at an early stage almost simply transmitted stored contents (documents). Then, a technique of running software such as CGI or Servlet on a Web server was developed so that a user can receive an instruction from a client, interpret it, and dynamically display data to the client. This allows running of an application on the Web system, and the Web technology has changed from a one-sided information providing means to a means such as a client/server system that is usable as a platform of an application. That is, a Web server can use a mechanism to activate a program in response to a request from the Web browser of a client by using CGI or Servlet. The Web server can dynamically generate contents on the basis of a program processing result by data input from the client and send the contents. Any Web application (Web service) can run on the Web. That is, the client side can use a desired application only by preparing a Web browser without installing any specific commercial application. Examples of typical software/services are an electronic store that provides an enormous amount of merchandise information and a document keeping service.

The Web application is more advantageous than the conventional client/server model because the client side uses only a Web browser common to operations and can therefore reduce the application maintenance/management cost. For this reason, a Web system is becoming an important service platform. At the beginning, a service of a Web system generally uses a single server configuration. However, malfunction of the single server stops the whole service, seriously affecting the business activity.

To prevent this, a service that requires year-round offer generally employs a redundant configuration to make a plurality of servers to offer the service. To attain higher system performance, it is also necessary to distribute workload to a plurality of servers.

However, even in a system built using a plurality of servers, a problem may be posed if a series of operations is carried out within one server (to be referred to as a "single session" hereinafter). To prevent this, a system has been implemented in which individual server information is embedded in cookie information, and a single server processes a single session by using a load distribution apparatus on the basis of the information (Japanese Patent Laid-Open No. 2003-256310). FIG. 1 is a block diagram showing the configuration of a conventional Web service system that causes a single server to process a single session by using a load distribution apparatus.

Even in the distributed environment built using a plurality of servers, to conduct, e.g., an operation check test, it is necessary to connect a specific server designated from a client. The method of connecting to a specific server includes, e.g., the following two solutions.

As the first solution, an IP address dedicated to access is given to each server, and operation check is executed by connecting to each address. In this method, however, the description of the IP addresses individually assigned to the hosts file of the client must be changed upon the operation test, resulting in poor operation efficiency. The host file describes the correlation between a host name and an IP address. Name resolution on a network is done by referring to this file.

As the second solution, cookie information is forcibly changed on a client's browser after access. This method rewrites communication data (packet) by using a dedicated network tool. This method however requires many procedures for change. The operation efficiency becomes low in confirming connection to a number of servers. The cookie indicates a mechanism to exchange information such as user information and access log between a Web browser and a Web server. There is a cookie which has a text format and is saved in a cache area for a client's Web browser. There is also a temporary cookie that is used only upon communication between two web servers and is not saved in a cache area. The Web technology generally uses cookie. A cookie is generally created on the Web client side and saved. The data saved at this time contains the name, value, and term of validity of the cookie and an effective domain/path. When a cookie is created, the browser on the client side checks whether a designated URL matches the effective domain/path of the cookie. If they match, the browser implicitly transmits the cookie data to the server side. When a cookie is used, and the client implicitly transmits the cookie information to the Web server side upon the next access or session, the Web server can identify that it is an access from a specific client.

SUMMARY OF THE INVENTION

The present invention enables an operation checker to easily select a specific one of a plurality of servers on a load distribution system and cause the selected server to respond to a request for a server test or operation monitoring.

According to the present invention, the foregoing problem is solved by providing an information processing system including a plurality of server apparatuses having an application to execute a Web service in response to a request from a client, and a load distribution apparatus which transmits the request from the client to one of the plurality of server apparatuses, wherein the load distribution apparatus comprises:
a connection log information determination unit adapted to determine whether the request from the client contains connection log information generated by the server apparatus; and
a server deciding unit adapted to decide, in accordance with a determination result of the connection log information determination unit, one of the plurality of server apparatuses as a transmission destination of the request from the client,
the server apparatus comprises:
a specific description determination unit adapted to determine whether the request from the client contains a specific description; and
a processing unit adapted to execute processing of the application in accordance with the request from the client and generate a response to the client, and
if the specific description determination unit determines that the specific description is contained, the processing unit generates connection log information and attaches the connection log information to the response to the client.

According to the present invention, the foregoing problem is solved by providing a server apparatus having an application to execute a Web service in response to a request from a client and connected to a load distribution apparatus which transmits the request from the client to one of a plurality of server apparatuses via a communication medium, comprising:
a specific description determination unit adapted to determine whether the request from the client contains a specific description; and
a processing unit adapted to execute processing of the application in accordance with the request from the client and generate a response to the client,
wherein if the specific description determination unit determines that the specific description is contained, the processing unit generates connection log information and attaches the connection log information to the response to the client.

According to the present invention, the foregoing problem is solved by providing an information processing apparatus which is connected, via a communication medium, to a plurality of server apparatuses having an application to execute a Web service in response to a request from the information processing apparatus and a load distribution apparatus which transmits the request from the information processing apparatus to one of the plurality of server apparatuses, comprising:
a specific mode designation unit adapted to add, to a URL as the request, one of a description representing a test mode and a specific description to designate one of the plurality of server apparatuses;
a transmission unit adapted to transmit the request containing the specific description to the load distribution apparatus;
a reception unit adapted to receive a response from the server apparatus, which contains connection log information generated by one of the plurality of server apparatuses on the basis of the request containing the specific description; and
a holding unit adapted to hold the connection log information.

According to the present invention, the foregoing problem is solved by providing a control method of an information processing system including a plurality of server apparatuses having an application to execute a Web service in response to a request from a client, and a load distribution apparatus which transmits the request from the client to one of the plurality of server apparatuses, comprising steps of:
causing the load distribution apparatus to execute steps of
determining whether the request from the client contains connection log information generated by the server apparatus, and
deciding, in accordance with a determination result in the connection log information determining step, one of the plurality of server apparatuses as a transmission destination of the request from the client; and
causing the server apparatus to execute steps of
determining whether the request from the client contains a specific description, and
executing processing of the application in accordance with the request from the client and generating a response to the client,
wherein if it is determined in the specific description determining step that the specific description is contained, connection log information is generated and attached to the response to the client in the processing step.

According to the present invention, the foregoing problem is solved by providing a control method of a server apparatus having an application to execute a Web service in response to a request from a client and connected to a load distribution apparatus which transmits the request from the client to one of a plurality of server apparatuses via a communication medium, comprising steps of:
determining whether the request from the client contains a specific description; and
executing processing of the application in accordance with the request from the client and generating a response to the client,
wherein if it is determined in the specific description determining step that the specific description is contained, connection log information is generated and attached to the response to the client in processing step.

According to the present invention, the foregoing problem is solved by providing a control method of an information processing apparatus which is connected, via a communication medium, to a plurality of server apparatuses having an application to execute a Web service in response to a request from the information processing apparatus and a load distribution apparatus which transmits the request from the information processing apparatus to one of the plurality of server apparatuses, comprising steps of:
adding, to a URL as the request, one of a description representing a test mode and a specific description to designate one of the plurality of server apparatuses;
transmitting the request containing the specific description to the load distribution apparatus;
receiving a response from the server apparatus, which contains connection log information generated by one of the plurality of server apparatuses on the basis of the request containing the specific description; and
holding the connection log information.

Further features of the present invention will become apparent from the following description of exemplary embodiments with reference to the attached drawings.

BRIEF DESCRIPTION OF THE DRAWINGS

FIG. 9 is a block diagram showing the configuration of a Web service system according to the second embodiment of the present invention;

DESCRIPTION OF THE EMBODIMENTS

Preferred embodiments of the present invention will now be described in detail in accordance with the accompanying drawings. It should be noted that the relative arrangement of the components, the numerical expressions and numerical values set forth in these embodiments do not limit the scope of the present invention unless it is specifically stated otherwise.

First Embodiment

Figure 2:
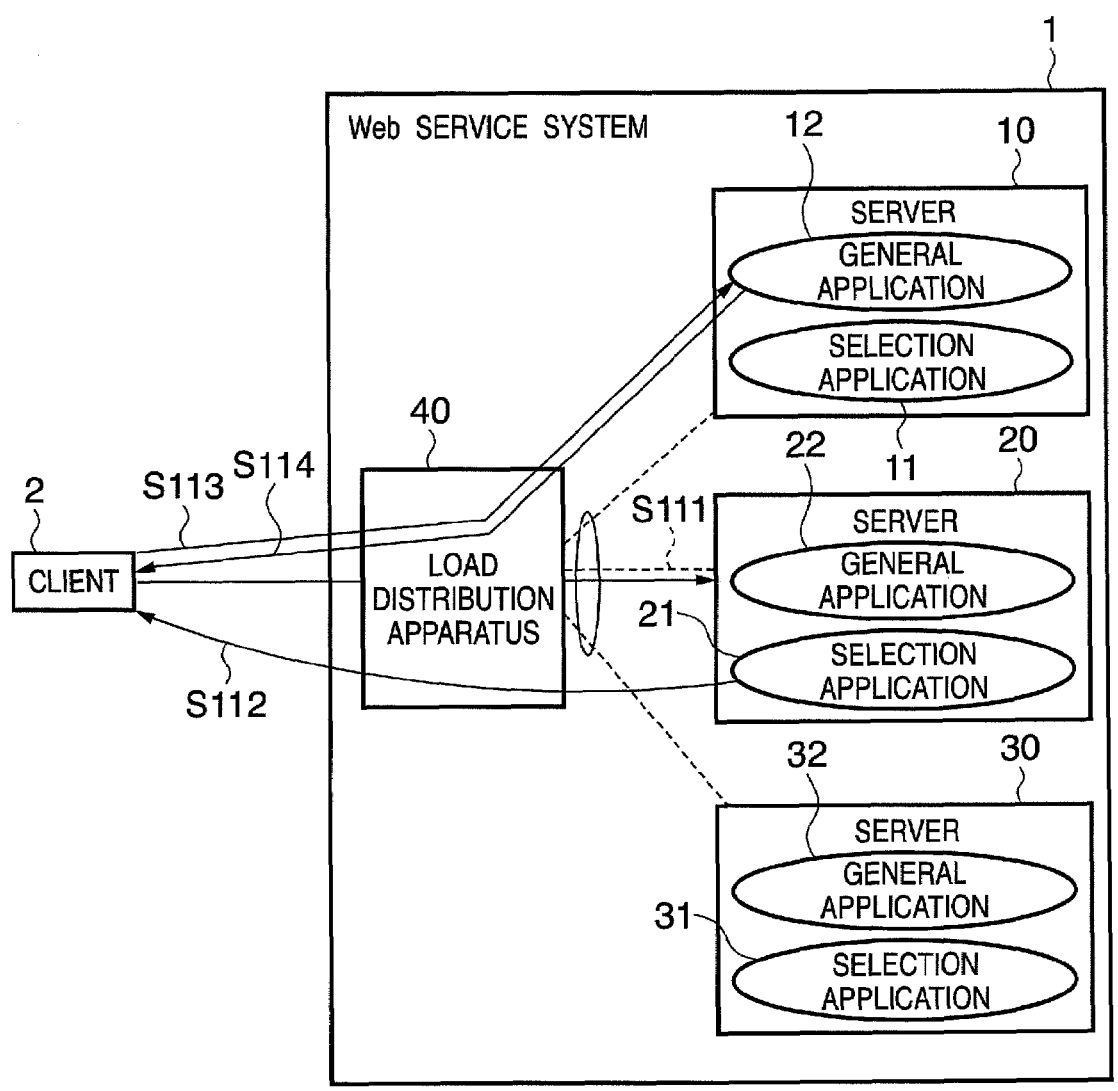
FIG. 2 is a block diagram showing the configuration of a Web service system according to the first embodiment of the present invention.

FIG. 2 is a block diagram showing the configuration of a Web service system according to the first embodiment of the present invention. Referring to FIG. 2, a Web service system 1 includes a plurality of servers (e.g., three servers 10, 20, and 30 in this embodiment) and a load distribution apparatus 40.

The servers 10, 20, and 30 have the same arrangement and selection applications 11, 21, and 31 and general applications 12, 22, and 32, respectively, installed as application programs running on them. The selection applications (control applications) 11, 21, and 31 are identical and simply run on different servers. This also applies to the general applications (service applications) 12, 22, and 32 which respond to a request from a client 2.

Each of the selection applications 11, 21, and 31 returns information in a URL parameter designated by a user to the client 2 as the cookie information of the client 2 without attaching a number unique to the host to server designation information in cookie information (S112). The information in the URL parameter (argument) includes, e.g., "SRV=1" of server designation parts 153 and 154 in FIG. 7 (to be described later). The general applications 12, 22, and 32 are used by the user, as described in "BACKGROUND OF THE INVENTION".

If the request from the client contains no cookie to designate a server, each server returns a cookie containing a number unique to the host to the client 2 to connect a subsequent session to the same server. For the illustrative convenience, each of the general applications 12, 22, and 32 is illustrated as one application in FIG. 2 but may include a plurality of applications. The servers 20 and 30 have the same arrangement as the server 10. The general applications or selection applications running on the servers are identical.

The load distribution apparatus 40 in FIG. 2 is a general-purpose apparatus to distribute a load to the servers 10, 20, and 30. The load distribution apparatus 40 confirms a server designation part in a cookie and distributes a request from the client 2 to an appropriate server. If cookie information contains no server designation information, the load distribution apparatus 40 selects a server on the basis of an appropriate rule such as DNS round robin. For example, first connection from the client 2 is done without cookie information. Hence, the connection destination is decided in accordance with DNS round robin. DNS round robin is one of load distribution techniques of assigning a plurality of IP addresses to one domain name. A traffic load is distributed to a plurality of IP addresses so that an access to, e.g., an HTTP server (Web server) can be divided into almost equal amounts and distributed to a plurality of server machines. In DNS round robin, generally, a plurality of systems having the same configuration are prepared, and a process request is sequentially distributed to the systems. In the example shown in FIG. 2, connection to the server 20 is established first in accordance with, e.g., the DNS round robin (S111).

Figure 1:
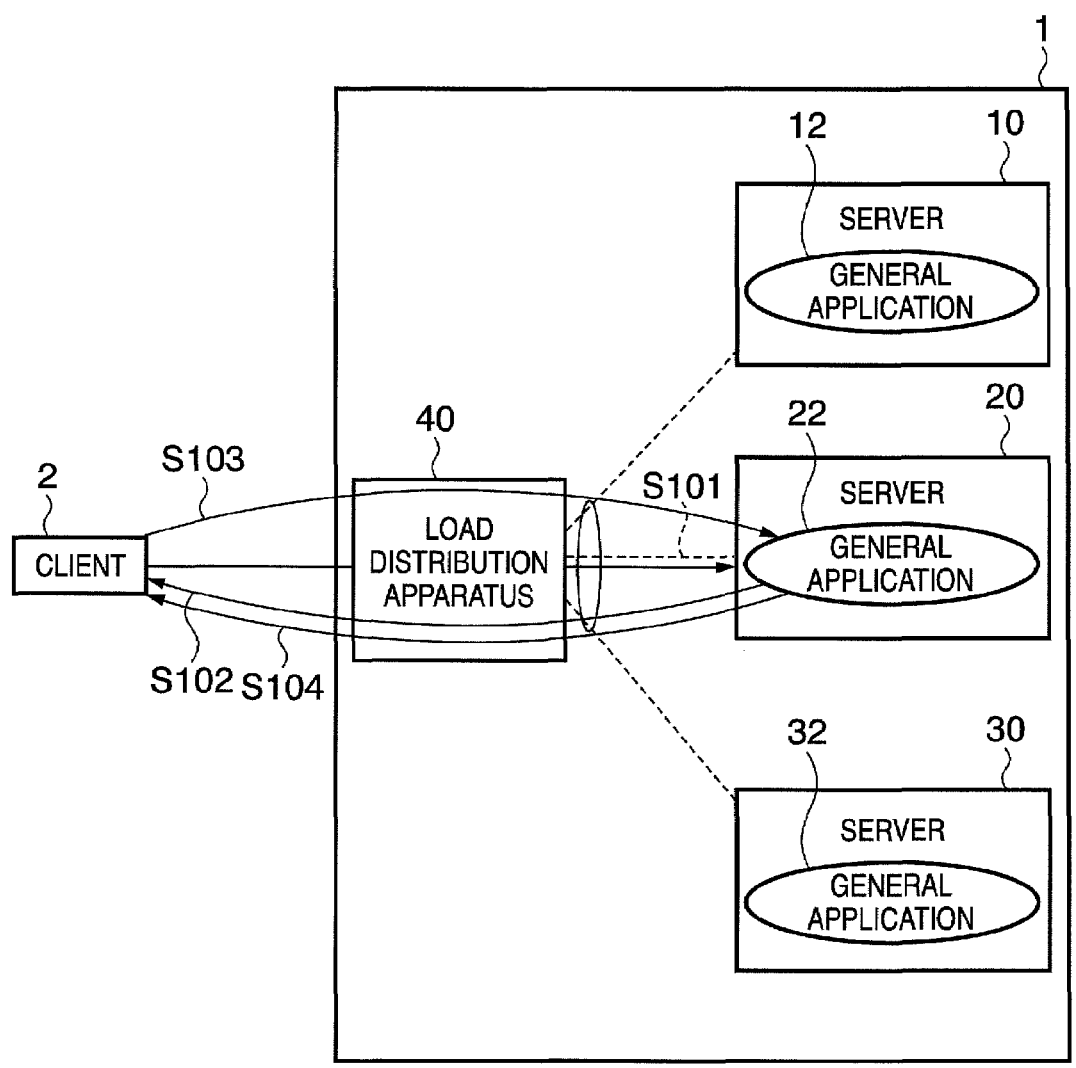
FIG. 1 is a block diagram showing the configuration of a conventional Web service system that causes a single server to process a single session by using a load distribution apparatus.

Then, the server side assigns cookie information. When client 2 makes a subsequent connection, the load distribution apparatus 40 establishes the connection to the same server on the basis of appropriate information contained in the cookie. In FIG. 1 that explains general load distribution, a cookie is assigned in accordance with a response from the server 20 (S102). In the second access from the client 2 (S103), since the cookie contains server information, connection to the same server 20 as in the first connection (S101) is done on the basis of the information.

As shown in FIG. 2, after the load distribution apparatus 40 connects the client 2 to the server 20 by DNS round robin, the server 20 assigns, by a response (S112), cookie information for the client 2, which contains information for connection to the server 10. The client 2 holds the cookie information for itself. In the second access (S113) from the client 2, since the cookie contains server information, the client 2 can connect to the desired server 10 on the basis of the information.

The client 2 is a computer used by a user of the Web service system 1. This computer can perform TCP/IP communication. The computer has a Web browser as an application and is therefore connectable to the Web service system 1 by using the Web browser. As the Web browser, a widely used browser such as Internet Explorer® available from Microsoft or Firefox® available from Mozilla Corporation is usable.

Figure 3:
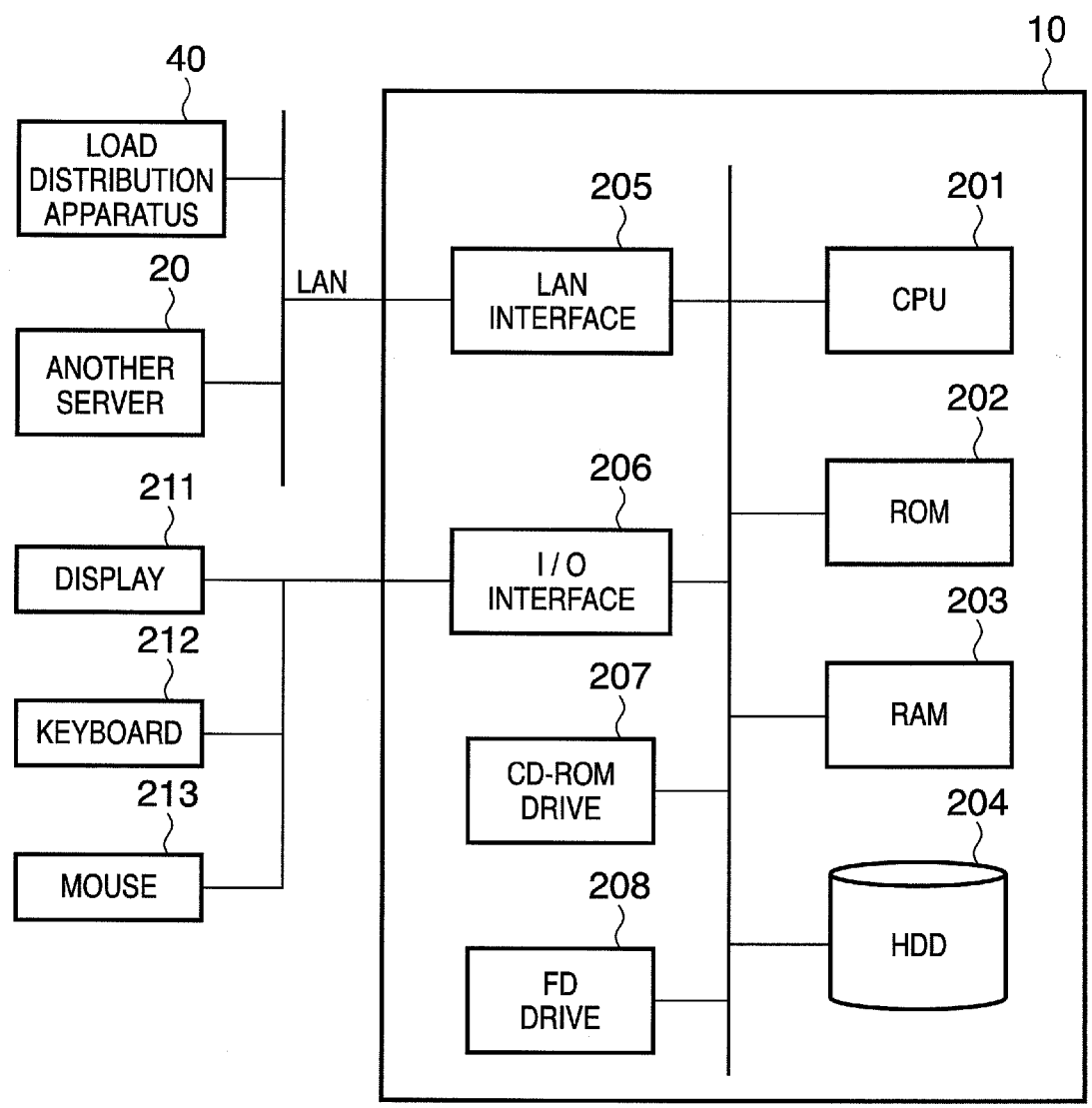
FIG. 3 is a block diagram showing a hardware configuration so as to explain the detailed arrangement of servers 10, 20, and 30 shown in FIG. 2.

FIG. 3 is a block diagram showing a hardware configuration so as to explain the detailed arrangement of the servers 10, 20, and 30 shown in FIG. 2. Each server comprises a CPU 201, ROM 202, RAM 203, hard disk drive (HDD) 204, and LAN interface 205 connected to a local area network (LAN) to communicate with the load distribution apparatus 40 or another server. Each server also comprises an I/O interface 206 which is connected to a display 211 that displays information such as an image on the basis of a server instruction, a keyboard 212 to input various kinds of information to the server, and a mouse 213 to point to an arbitrary position on the display 211. A server OS (Operating System) is installed and runs on the configuration of the server 10 shown in FIG. 3. General examples of the server OS are Unix®, Linux®, and Windows Server®.

Each server implements the function of a Web server by reading out and executing a program recorded on a predetermined recording medium. As the predetermined recording medium, a "fixed physical medium" such as the hard disk drive (HDD) 204, ROM 202, or RAM 203 provided inside or outside the server 10 is used in general. A "portable physical medium" such as a flexible disk (FD) 208, CD-ROM 207, MO disk, DVD disk, magnetooptical disk, or IC card may be used. The predetermined recording medium includes any other recording media that record a program readable by a server, including a "communication medium" to hold a program for a short period of time upon transmitting it, like a LAN connected to other servers.

That is, the program is computer-readably recorded on a recording medium such as the above-described "portable physical medium", "fixed physical medium", or "communication medium". Each server implements the function of a Web server by reading out the program from the recording medium and executing it. The above-described OS is a program. The OS is the program of the uppermost layer running on the server. The program of each Web application runs in the lower layer of the OS. This relationship is the same as that between the Windows® OS running on a general PC (Personal Computer) and an installed application, as is well-known.

Figure 4:
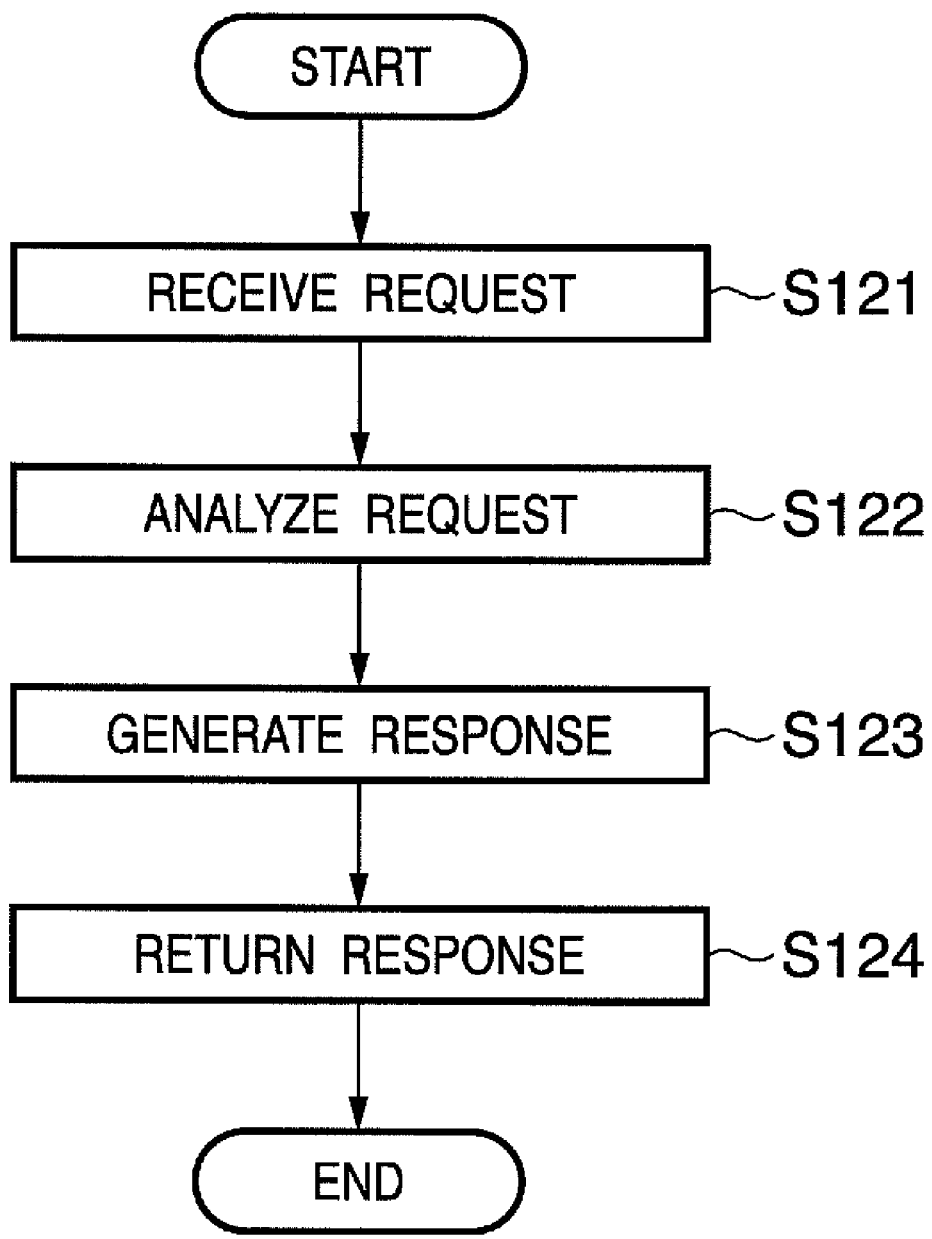
FIG. 4 is a flowchart for explaining a processing procedure when the servers execute selection applications 11, 21, and 31.

FIG. 4 is a flowchart for explaining a processing procedure when the servers execute the selection applications 11, 21, and 31, respectively.

Figure 7:
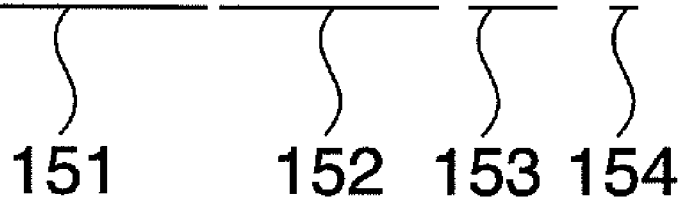
FIG. 7 is a view showing an example of a connection URL to the selection applications 11, 21, and 31 installed in the servers.

The server receives a request from the client 2 via the load distribution apparatus 40 (step S121). The server analyzes the received request and obtains a server number in the URL parameter (step S122). More specifically, the server derives the server number by analyzing the argument value 154 of the predetermined character string 153 in the request from the client 2, as shown in FIG. 7.

The server creates a response to the client 2 (step S123). In this case, the server attaches the server number requested by the client 2 to the cookie information of the response on the basis of the analysis result in step S122. Finally, the server returns the response created in step S123 to the client 2 as response return (step S124).

Figure 5:
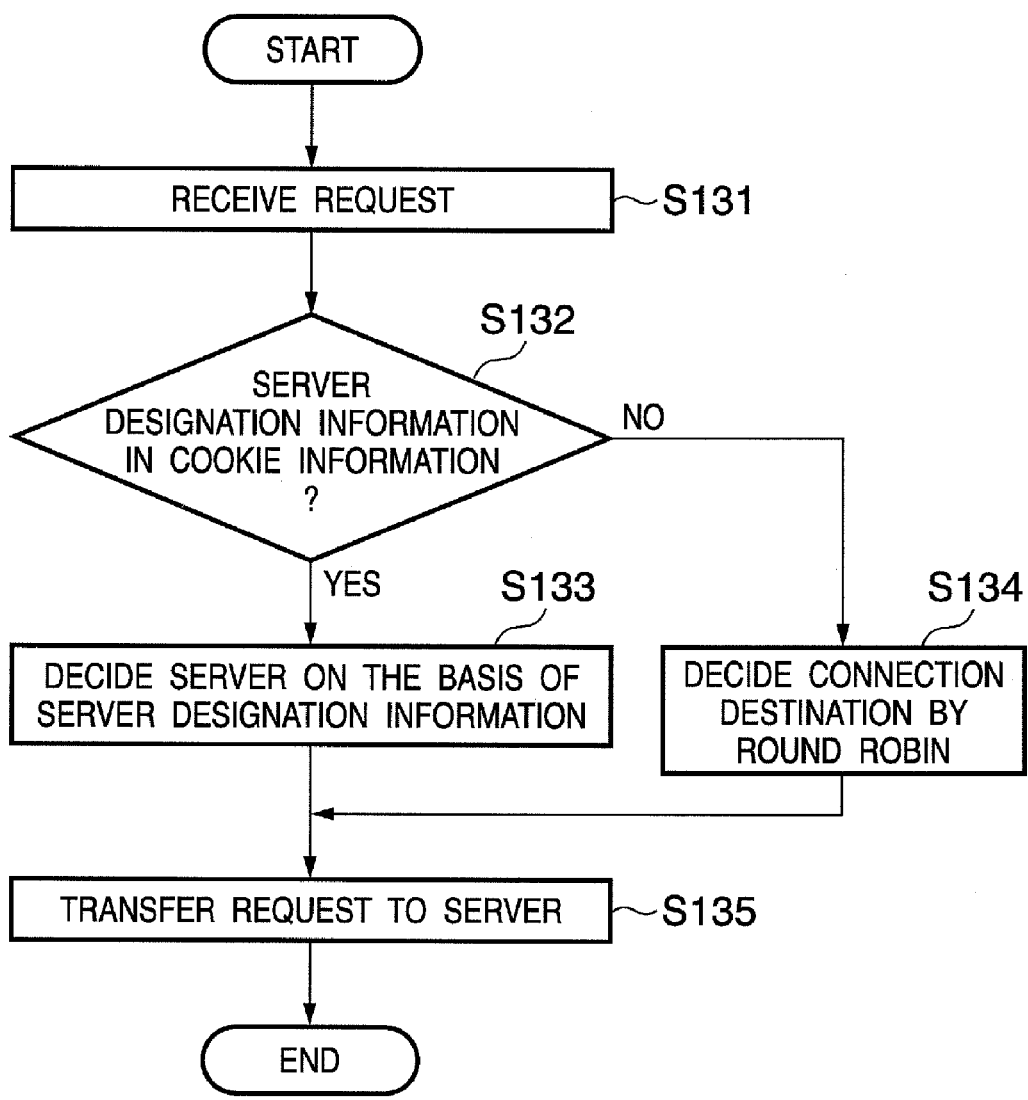
FIG. 5 is a flowchart for explaining the processing procedure of a load distribution apparatus 40.

FIG. 5 is a flowchart for explaining the processing procedure of the load distribution apparatus 40. The load distribution apparatus 40 receives a request from the client 2 (step S131). The load distribution apparatus 40 searches for server designation information from the cookie information upon request (step S132). If server designation information is present (YES), the process advances to step S133. If no server designation information is present (NO), the process advances to step S134.

In step S133, the load distribution apparatus 40 decides, on the basis of the server designation information in the cookie information, the server of the transfer destination to transfer the request. In step S134, since the cookie information contains no server designation information, the request transfer destination is indefinite. In this case, the load distribution apparatus 40 decides the server which is to transfer the request on the basis of its rule. The load distribution apparatus 40 decides the server in accordance with, e.g., DNS round robin or the load situation of each server.

The load distribution apparatus 40 transfers the request to the server of the transfer destination decided in step S133 or S134 (step S135).

Figure 6:
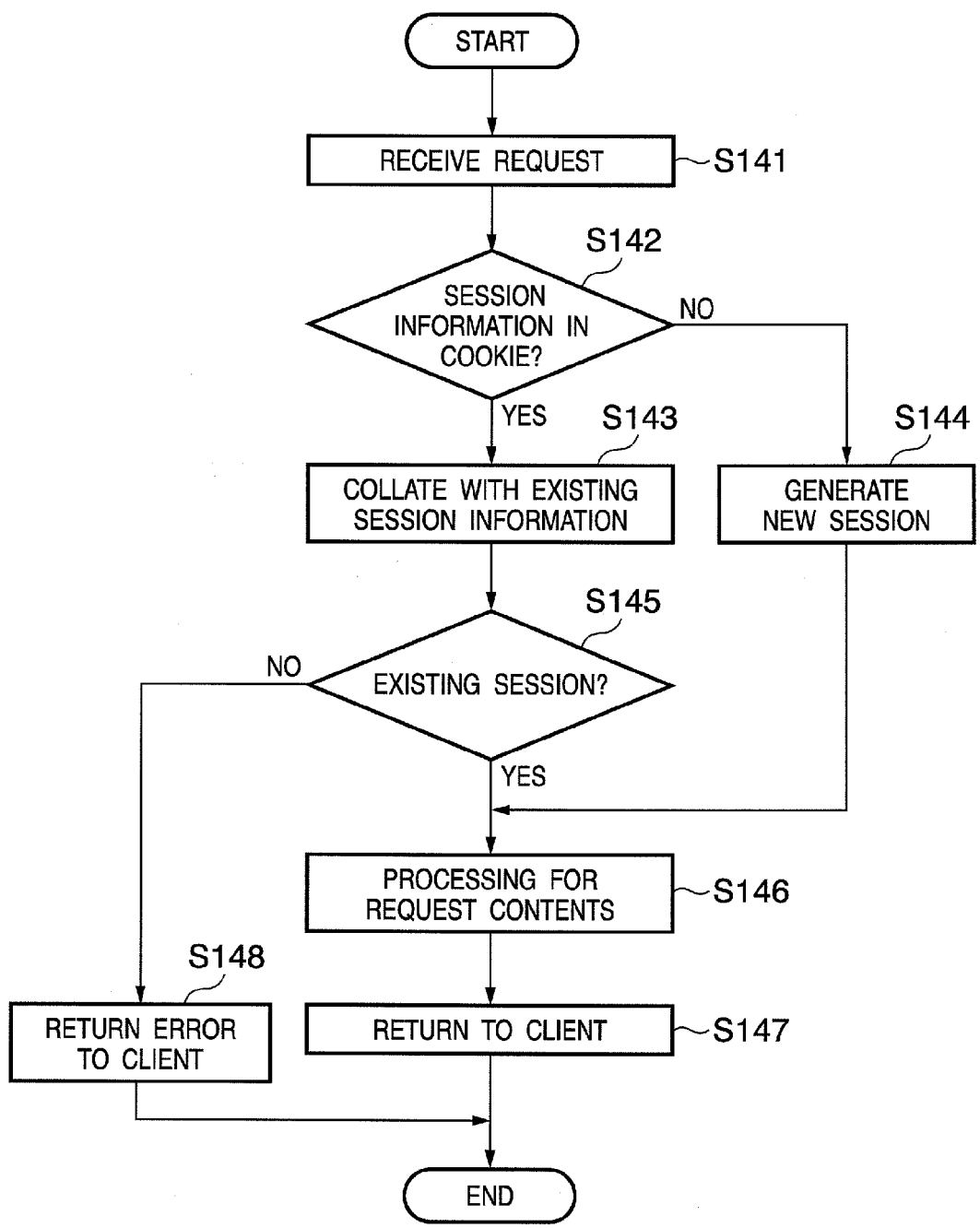
FIG. 6 is a flowchart for explaining processing by general applications 12, 22, and 32 installed in the servers.

FIG. 6 is a flowchart for explaining processing by the general applications 12, 22, and 32 installed in the servers. A description will be made below by representatively exemplifying the general application 12 installed in the server 10. The server 10 receives a request from the client 2 via the load distribution apparatus 40 (step S141). The server 10 confirms whether the request from the client 2 contains session information to uniquely determine a series of operations (step S142). If session information is present (YES), the process advances to step S143. If no session information is present (NO), the process advances to step S144. On the basis of the session information, the server 10 recognizes the operation of the client 2 as a series of operation and holds authentication information and operation information on the server side. A communication protocol includes two communication connection concepts, i.e., session and connection. In this embodiment, a description will be made by exemplifying session information, though the communication form is not particularly limited.

In step S143, the server 10 collates the session information in the cookie information with existing session information. The process advances to step S145. On the other hand, in step S144, the server 10 determines that the connection is new and creates new session information.

In step S145, the server 10 determines whether collation with existing session information has failed in step S143. If the session information in the request from the client 2 is not included in the session information group on the server 10, the collation is determined to have failed. In this case, the server 10 determines that the request is unauthorized. If collation has failed in step S145, the process advances to step S148. If collation is successful, the process advances to step S146.

In step S146, the server executes processing corresponding to the request from the client 2 on the basis of the session information. The server 10 sends a reply to the client 2 (step S147). On the other hand, in step S148, since the request from the client 2 is an unauthorized request, the server 10 returns an error message to the client 2.

FIG. 7 is a view showing an example of a connection URL to the selection applications 11, 21, and 31 installed in the servers. Referring to FIG. 7, a server name 151 indicates a unique host name on the network. This is based on a general DNS technique, i.e., a technique of converting a computer name or the domain name into IP address of a computer and vice versa. An application name 152 indicates a connection request to the selection applications 11, 21, and 31. FIG. 7 exemplifies "select SRV", though an arbitrary application name is usable. The variable 153 designates the server of the URL parameter. FIG. 7 shows an example of "SRV". Any character string unique to a selection application can be used. The argument 154 is the argument of the variable 153 and can designate a server by its value. For example, argument "1" corresponds to the server 10, argument "2" corresponds to the server 20, and argument "3" corresponds to the server 30. The argument 154 in FIG. 7 is "1" and therefore designates the server 10.

Figure 8:
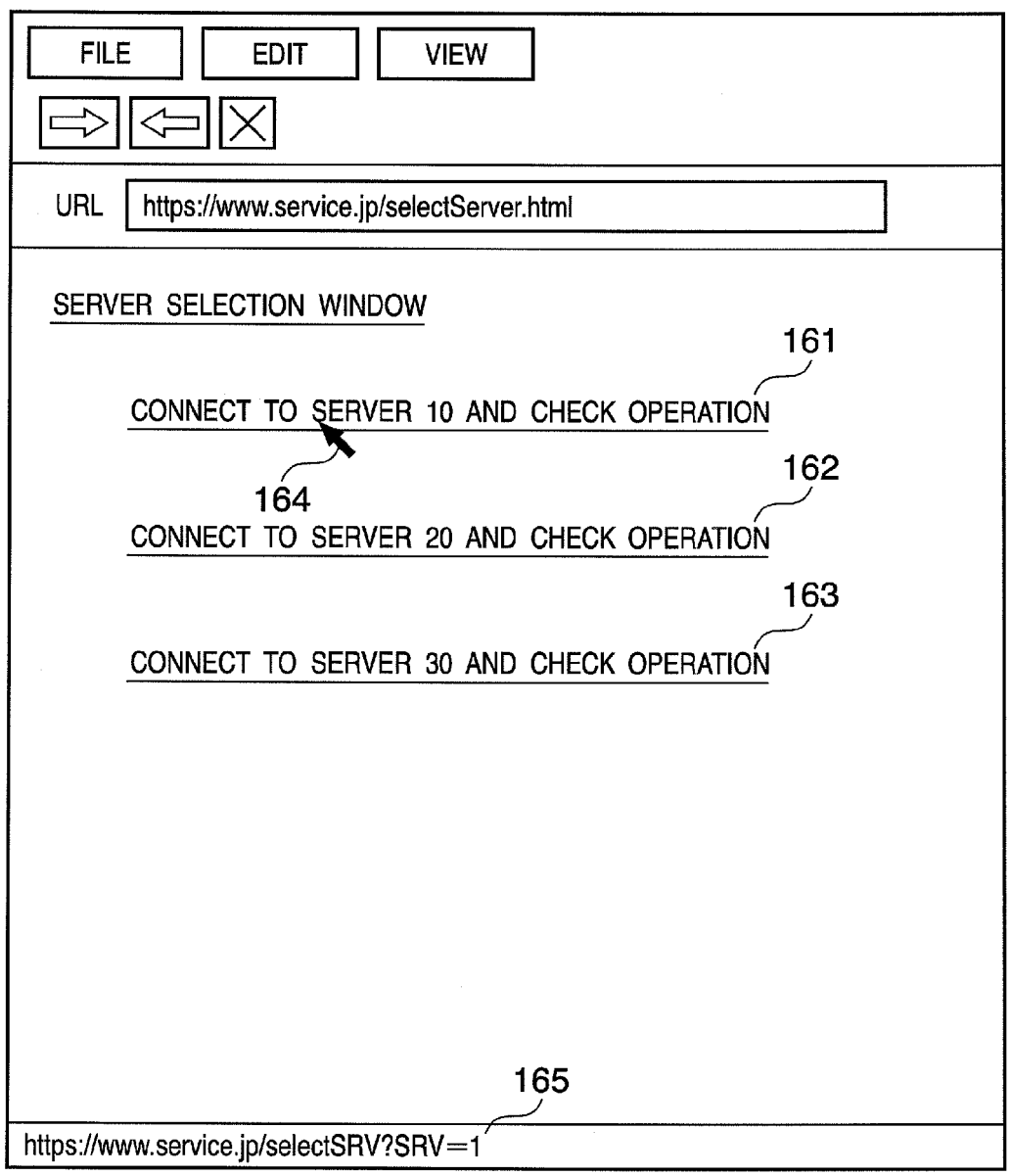
FIG. 8 is a view showing an example of a Web server selection page display window that the operation checker can display at a client 2.

FIG. 8 is a view showing an example of a Web server selection page display window that the operation checker can display at the client 2.

Referring to FIG. 8, links 161, 162, and 163 have URLs to jump to selection applications to select the servers. A mouse pointer 164 is used to select the link 161 to select the server 10. A link destination indicator 165 shows the detailed URL of the link 161 selected by the mouse pointer 164.

The server designation information in the URL parameters 153 and 154 shown in FIG. 7 is the argument (server number) 154 unique to a server. Not a number but an alphabet or a combination of an alphabet and a number may be used if it can identify each server. The server designation information may be handled as information encrypted using a hash function.

Each of the general applications 12, 22, and 32 is described above as one Web application but may include a plurality of applications.

A response (S112) from the selection applications 11, 21, and 31 is not particularly specified. The response may be a redirect response to, e.g., an initial window such as a login request window of the general applications 12, 22, and 32. "Redirect" indicates transfer from one URL to another URL or changing the program input source or output destination to a destination different from the actual output destination. In this case, operation check of a desired server can be started by one click on the server selection window shown in FIG. 8.

According to the first embodiment, the operation checker can easily select a specific one of a plurality of servers on a load distribution system and cause the selected server to respond to a request for a server test or operation monitoring.

Second Embodiment

The second embodiment of the present invention will be explained next.

FIG. 9 is a block diagram showing the configuration of a Web service system according to the second embodiment of the present invention. A client 2 transmits a first request to a server (S201). In this embodiment, selection applications 13, 23, and 33 running on servers 10, 20, and 30 request a general application in a server indicated by the URL parameter of the received request to execute processing. In FIG. 9, for example, since no cookie information exists at first, the request from the client 2 is transferred to the server 20 in accordance with the rule of a load distribution apparatus 40. Upon recognizing that the server 10 should respond to the request, the server 20 notifies the server 10 (S202), receives a reply (S203), and returns the reply to the client 2 (S204). After that, a request from the client 2 is transmitted directly to the desired server 10 (S205). In this embodiment, the server 10 embeds a cookie (S202 and S203), and the server 20 responds to the client 2 by proxy (S204). After that, the client 2 is directed to the server 10 by using the cookie information (S205 and S206).

Figure 10:
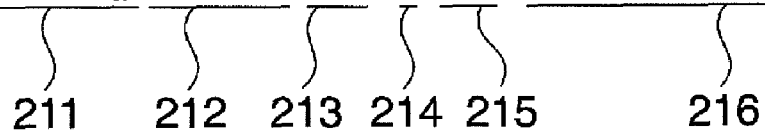
FIG. 10 is a view showing an example of a first request transmitted from a client 2 in the second embodiment.

FIG. 10 is a view showing an example of a first request transmitted from the client 2 in the second embodiment. Referring to FIG. 10, a host part 211, application designation part 212, and server designation parts 213 and 214 have the same functions as the parts in FIG. 7 of the first embodiment. In FIG. 10, URL designation parts 215 and 216 are also added to the argument. The selection applications 13, 23, and 33 transmit a URL request indicated by the URL designation part 216 to a server indicated by the server designation part 214 and returns a response to the client 2 like a proxy. That is, in the second embodiment, the load distribution apparatus 40 in FIG. 9 first transmits a request from the client 2 to the server 20 (S201). This request designates the server 10 because the argument of the server designation part 213 is "1", as is apparent from FIG. 10, and transmits a URL described by the URL designation parts 215 and 216 to the server 10 (S202).

Figure 11:
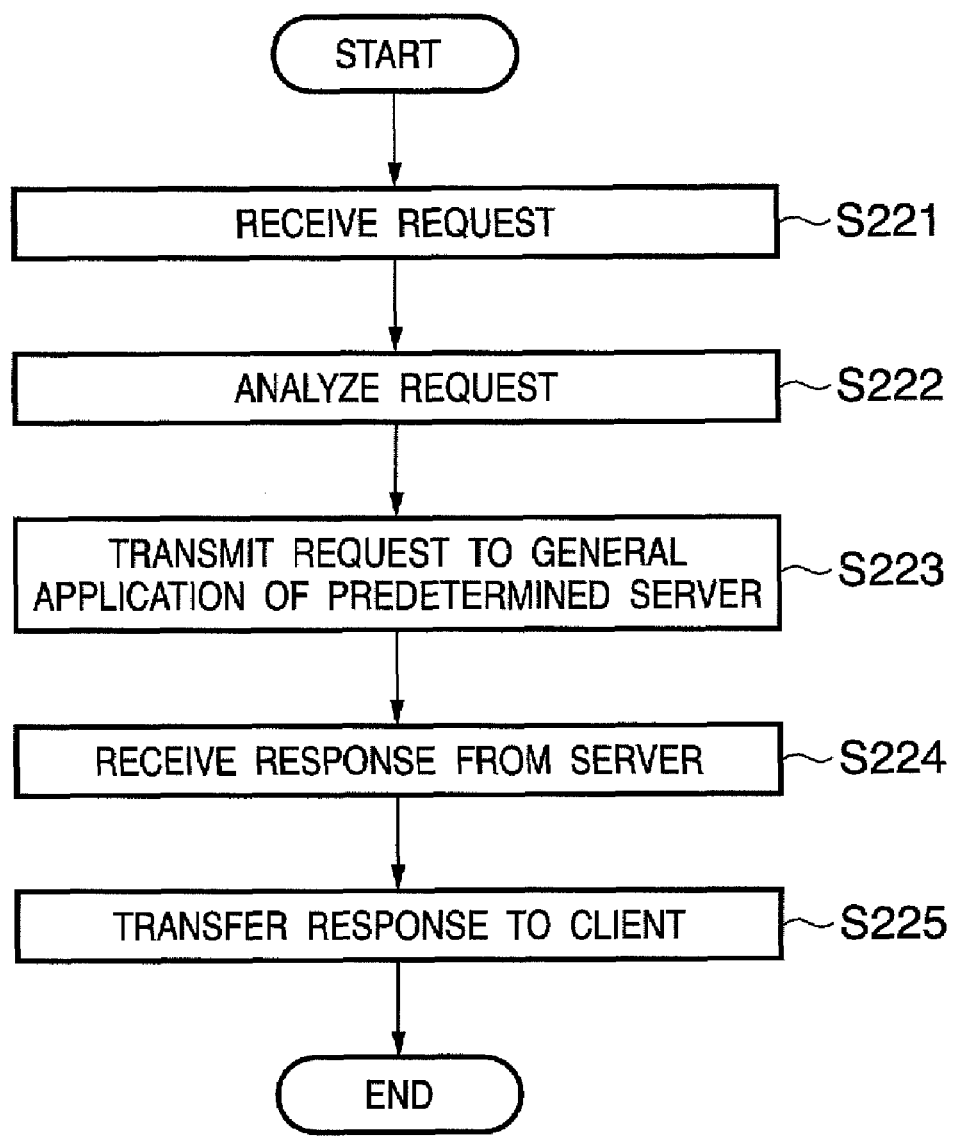
FIG. 11 is a flowchart for explaining processing by selection applications 13, 23, and 33 in the second embodiment.

FIG. 11 is a flowchart for explaining processing by the selection applications 13, 23, and 33 in the second embodiment. Processing by the selection application 23 installed in the server 20 will representatively be described below.

The selection application 23 receives a request from the client 2 (S221). The selection application 23 analyzes the URL parameter part of the request as shown in FIG. 10 as preprocessing before the next processing (S222). The selection application 23 transmits a URL request indicated by the request 216 to a server designated by the server designation part 214 on the basis of the analysis result in step S222 (S223). For example, the URL request as shown in FIG. 10 is transmitted to the server 10.

Then, the selection application 23 receives, from the server 10, a response (S203) to the request transmitted in step S223 (step S224). The selection application 23 returns the response received from the server in step S224 to the client 2 without processing it (S225).

The arrangements and functions of general applications 12, 22, and 32 and the load distribution apparatus 40 and processing procedures represented by flowcharts except those described above are the same as in the first embodiment. The processing of the above-described embodiments may be executed not in the normal load distribution mode but in a mode wherein the client side designates a specific server from the plurality of servers and causes it to respond to a request.

As described above, the Web service system according to the first and second embodiments allows an operation checker to easily select a Web server as an evaluation target in a server application environment with load distribution. Since the application server side executes any configuration change, the remaining constituent elements of the system, including the load distribution apparatus 40, need not be changed. In addition, the client side can easily designate each server and monitor an application operation by using a monitor application.

While the present invention has been described with reference to exemplary embodiments, it is to be understood that the invention is not limited to the disclosed exemplary embodiments. The scope of the following claims is to be accorded the broadcast interpretation so as to encompass all such modifications and equivalent structures and functions.

This application claims the benefit of Japanese Patent Application No. 2005-360837 filed on Dec. 14, 2005, which is hereby incorporated by reference herein in its entirety.

What is claimed is:

1. An information processing system comprising:
a plurality of server apparatuses each having an application to execute a Web service in response to a request from a client; and
a load distribution apparatus which transmits the request from the client to one of the plurality of server apparatuses;
wherein the load distribution apparatus includes:
a connection log information determination unit adapted to determine whether the request from the client contains connection log information generated by the server apparatus; and
a server deciding unit adapted to decide, in accordance with server designation information in the connection log information, one of the plurality of server apparatuses as a transmission destination of the request from the client, if said connection log information determination unit determines that the request from the client contains the connection log information; and
wherein each server apparatus includes:
a specific description determination unit adapted to determine whether the request from the client contains a specific description, wherein the specific description includes a description representing a test mode and a description designating one of the plurality of server apparatuses, the descriptions being contained in a URL; and a processing unit adapted to execute processing of the application in accordance with the request from the client and generate a response to the client;

wherein if the specific description determination unit determines that the request from the client contains the specific description, the processing unit generates connection log information containing server designation information for indicating a connection to the server designated by the specific description and attaches the generated connection log information to the response to the client.

2. The system according to claim 1, wherein the specific description contained in the request from the client is one of a description representing a test mode and a description representing one of the plurality of server apparatuses, each of the descriptions being contained in a URL.

3. The system according to claim 1, wherein if said connection log information determination unit determines that the request from the client contains no connection log information, said server deciding unit decides the server apparatus of the transmission destination by round robin scheduling.

4. The system according to claim 1, wherein the connection log information generated by the server apparatus is cookie information containing the server designation information.

5. A control method of an information processing system including a plurality of server apparatuses each having an application to execute a Web service in response to a request from a client, and a load distribution apparatus which transmits the request from the client to one of the plurality of server apparatuses, comprising the steps of:

configuring the load distribution apparatus to execute the steps of first determining whether the request from the client contains connection log information generated by the server apparatus, and deciding, in accordance with server designation information in the connection log information, one of the plurality of server apparatuses as a transmission destination of the request from the client, if in said first determining step, it is determined that the request from the client contains the connection log information; and configuring the server apparatus to execute the steps of second determining whether the request from the client contains a specific description, wherein the specific description includes a description representing a test mode and a description designating one of the plurality of server apparatuses, the descriptions being contained in a URL, and executing processing of the application in accordance with the request from the client and generating a response to the client, wherein if it is determined in said second determining step that the request from the client contains the specific description, connection log information containing server designation information for indicating a connection to the server designated by the specific description is generated and attached to the response to the client in said executing processing step.

6. The method according to claim 5, wherein the specific description contained in the request from the client is one of a description representing a test mode and a description representing one of the plurality of server apparatuses, each of the descriptions being contained in a URL.

7. The method according to claim 5, wherein if it is determined in said first determining step that the request from the client contains no connection log information, in said deciding step, the server apparatus of the transmission destination is decided by round robin scheduling.

8. The method according to claim 5, wherein the connection log information generated by the server apparatus is cookie information containing the server designation information.

* * * * *